(12) United States Patent
Bouveret

(10) Patent No.: US 9,076,350 B2
(45) Date of Patent: Jul. 7, 2015

(54) FOOD CONTAINER FOR MICROWAVE USE

(75) Inventor: Nicolas Bouveret, Mirabel (CA)

(73) Assignee: NORTH AMERICA I.M.L. CONTAINERS, St-Placide (CA)

( * ) Notice: Subject to any disclaimer, the term of this patent is extended or adjusted under 35 U.S.C. 154(b) by 527 days.

(21) Appl. No.: 13/499,816

(22) PCT Filed: Oct. 1, 2010

(86) PCT No.: PCT/CA2010/001538
§ 371 (c)(1),
(2), (4) Date: May 30, 2012

(87) PCT Pub. No.: WO2011/038492
PCT Pub. Date: Apr. 7, 2011

(65) Prior Publication Data
US 2012/0228288 A1    Sep. 13, 2012

Related U.S. Application Data

(60) Provisional application No. 61/247,602, filed on Oct. 1, 2009.

(51) Int. Cl.
| | | |
|---|---|---|
| H05B 6/80 | (2006.01) |
| G09F 3/02 | (2006.01) |
| B29C 45/14 | (2006.01) |
| B65D 81/34 | (2006.01) |
| G09F 3/00 | (2006.01) |
| B29K 705/00 | (2006.01) |

(52) U.S. Cl.
CPC ............ *G09F 3/02* (2013.01); *B29C 45/14778* (2013.01); *B29C 2045/14918* (2013.01); *B29K 2705/00* (2013.01); *B65D 81/3453* (2013.01); *G09F 3/0297* (2013.01); *G09F 2003/0272* (2013.01)

(58) Field of Classification Search
CPC . G09F 3/02; G09F 3/0297; G09F 2003/0272; B29C 45/14778; B29K 2705/00; B65D 81/3453
USPC ........... 219/725, 728, 729, 730, 759; 264/279
See application file for complete search history.

(56) References Cited

U.S. PATENT DOCUMENTS

| | | | | |
|---|---|---|---|---|
| 4,866,232 A | * | 9/1989 | Stone | 219/730 |
| 2007/0252382 A1 | * | 11/2007 | Baum et al. | 283/107 |
| 2010/0006567 A1 | * | 1/2010 | Cole | 219/730 |

FOREIGN PATENT DOCUMENTS

| | | |
|---|---|---|
| CA | 1082655 A1 | 7/1980 |
| CA | 2648628 A1 | 11/2007 |
| EP | 0336325 A2 | 10/1989 |

*Primary Examiner* — Dana Ross
*Assistant Examiner* — Lindsey C Teaters
(74) *Attorney, Agent, or Firm* — Norton Rose Fulbright Canada LLP

(57) ABSTRACT

A food container for microwave use comprises at least one compartment for receiving a food item, the container portion having a structural wall defining the lateral sides of the container portion. The structural wall is made of a polymer. A label is secured to the structural wall and covers continuously the lateral sides of the container portion. The label has an inner surface against the structural wall and an outer surface oriented away from the structural wall. The label comprises a substrate defining the outer surface of the label and a metallic ink defining partly the inner surface of the label. The metallic ink defines a continuous coating on the label with openings. The openings have a selected dimension to allow some microwaves to pass therethrough to reach the food item in the compartment. A method for fabricating a food container for microwave use is also provided.

12 Claims, 6 Drawing Sheets

FOOD CONTAINER FOR MICROWAVE USE

CROSS-REFERENCE TO RELATED APPLICATION

This patent application claims priority from U.S. provisional patent application No. 61/247,602, entitled "Food container for microwave use," filed on Oct. 1, 2009, the specification of which is hereby incorporated by reference.

FIELD OF THE APPLICATION

The present application generally relates to food containers and, more specifically, to food containers for microwave use.

BACKGROUND OF THE ART

Microwave ovens have revolutionized home cooking. The use of microwaves greatly accelerates the heating of food. However, the food cooked with a microwave oven may be non-uniformly heated. For instance, meat being defrosted or cooked by microwave is often very well cooked in some parts, and raw in others. In another example, some frozen meals have foods that require different levels of energy to be suitably cooked, such as vegetables and meats. Accordingly, microwave ovens are not a popular solution for cooking gastronomic food due to this uneven-temperature issue. Microwave ovens are therefore limited in use (e.g., soups, foods such as rice, etc.), and consumers opt not to use the microwave in many instances. Moreover, frozen lunches may lack in popularity due to the effect of the microwave on the foods it contains.

SUMMARY OF THE APPLICATION

It is therefore an aim of the present disclosure to provide a food container and method that address issues associated with the prior art.

Therefore, in accordance with a first embodiment of the present application, there is provided a food container for microwave use, comprising: a container portion comprising at least one compartment for receiving a food item, the container portion having at least one structural wall defining the lateral sides of the container portion, the structural wall being made of a polymer; a label secured to the structural wall and covering continuously the lateral sides of the container portion, the label having an inner surface against the structural wall and an outer surface oriented away from the structural wall, the label comprising: a substrate defining the outer surface of the label; and a metallic ink defining partly the inner surface of the label, the metallic ink defining a continuous coating on the label with openings in the continuous coating, the openings having a selected dimension to allow a given amount of microwaves to pass therethrough to reach the food item in the compartment.

Further in accordance with the first embodiment, the selected dimension of the openings of the food container has a maximum value ranging between 3 mm and 22 mm.

Still further in accordance with the first embodiment, the openings of the food container have a circular shape, and the selected dimension is the diameter.

Still further in accordance with the first embodiment, the food container comprises at least two of the compartment, the selected dimension of the openings in the coating on the portion of the structural defining a first one of the compartment being greater than the selected dimension of the openings in the coating on the portion of the structural defining a second one of the compartment to allow more microwaves per coating surface to reach the food item of the first compartment.

Still further in accordance with the first embodiment, the food container comprises at least two of the compartment, a ratio of opening surface per coating surface on the portion of the structural defining a first one of the compartment being greater than a ratio of opening surface per coating surface on the portion of the structural defining a second one of the compartment to allow more microwaves per coating surface to reach the food item of the first compartment.

Still further in accordance with the first embodiment, the food container further comprises a binder and a solvent in the metallic ink, the solvent evaporating to cause the metallic ink to bond to the structural wall.

Still further in accordance with the first embodiment, the coating of metallic ink in the food container has a thickness of 3 μm.

Still further in accordance with the first embodiment, the metallic ink in the food container has a resistivity of 0.1 $\Omega/\text{ft}^2$.

Still further in accordance with the first embodiment, the metallic ink in the food container comprises silver bits in a solvent.

Still further in accordance with the first embodiment, the food container has silver bits that are a silver coating on a copper base.

Still further in accordance with the first embodiment, the food container further comprises ornamentation printed on the outer surface of substrate.

Still further in accordance with the first embodiment, the food container further comprises a coating of black ink between the substrate and the metallic ink.

Further in accordance with a second embodiment of the present application, there is provided a method for fabricating a food container for microwave use comprising: producing a label having a metallic-ink layer thereon, the metallic-ink layer having at least metal parts in a binder; inserting the layer into a mold cavity, with the metallic-ink layer oriented inwardly; and molding a food container by injecting a polymeric material into the mold cavity while not exposing the metallic-ink layer to a turbulent flow of the polymeric material, thereby securing the label to the food container.

DESCRIPTION OF THE PREFERRED EMBODIMENTS

Figure 2:
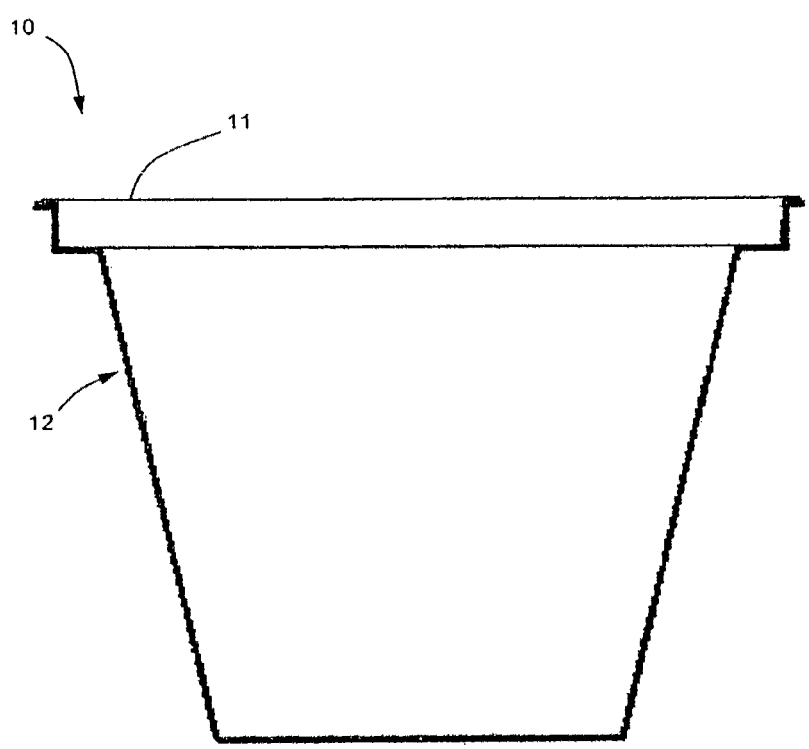
FIG. 2 is a schematic view of the food container for microwave of FIG. 1.

Referring to the drawings, and more particularly to FIG. 2, a food container for microwave use is generally shown at 10. The food container 10 is illustrated as having a frustoconical shape, with a flange at an upper rim, but may have any other suitable shapes. Moreover, the food container 10 may define a single cavity or may alternatively have multiple compartments as well. For instance, the food container has different compartments for separately cooking given foods. The food container 10 may produce a generally uniform temperature in the food, by allowing a given amount of microwaves to pass according to the geometry of the food container 10.

A sealing label 11 may be removably positioned on top of the food container 10. The label 11 is positioned thereon after the food container 10 is filled with food. A lid (not shown) may then be used to close off the container 10.

Figure 1:
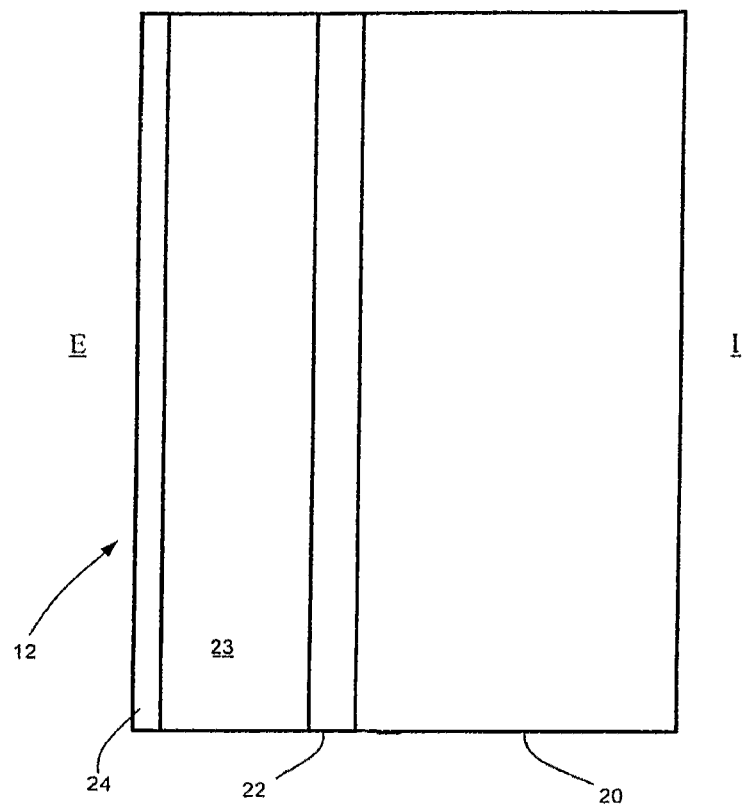
FIG. 1 is a schematic sectional view of a side wall of a food container for microwave in accordance with the present disclosure.

The food container 10 has a side wall portion 12. Referring to FIG. 1, a sectional view of the side wall portion 12 is provided without hatching for simplicity purposes. An interior of the container is shown as I, whereas an exterior of the container is shown as E. The side wall portion 12 has a structural wall 20. The structural wall 20 is made of a molded polymer. For instance, inner-mold labeling technology is used for the container 10, whereby a polymer such as polypropylene is well suited for forming the structural wall 20. It is pointed out that the polymer used for the structural wall 20 must be a food-grade polymer.

An adhesive layer may be used on an exterior of the structural wall 20, so as to secure a label to the structural wall 20. The label has layers 22 to 24, and is therefore referred to hereinafter as label 22-24.

The interior layer is a metallic-ink layer 22 that is against the structural wall. The metallic-ink layer 22 may be 3 μm thick, and is used to block a given portion of microwaves. Other thicknesses are considered as well. The metallic-ink layer 22 forms a metallic coating that continuously covers the lateral sides of the container 10.

Substrate 23 is provided to support the metallic-ink layer 22, as well as an exposed layer 24. The substrate 23 may consist of cardboard, paper, plastic or any other suitable material. The substrate 23 will support conventional inks or UV inks which form the exposed layer 24. The substrate 23 supports the metallic inks of the layer 22 on its other side.

As mentioned above, the exposed layer 24 is a printable layer that features ink and a coating, and is typically less than 1 μm in thickness. As it defines the visible portion of the container 10, the exposed layer 24 features ornamental and decorative elements, such as logos, images, contents data and the like.

Figure 4:
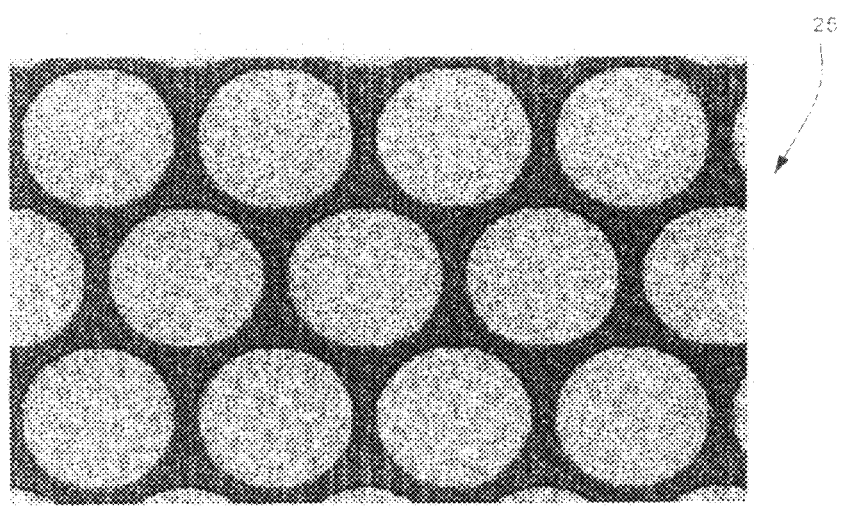
FIG. 4 is an enlarged view of a metallic-ink layer of the label of FIG. 3.

Referring concurrently to FIGS. 1 and 4, the metallic-ink layer 22 is illustrated in greater detail. The metallic-ink layer 22 is uniformly applied on the substrate 23 or on the structural wall 20. The metallic-ink layer 22 has in one instance a resistivity of at most 0.1 $\Omega/ft^2$. The metallic ink 22 is preferably silver bits and binder compound, diluted in a highly volatile solvent, that dries rapidly. When the metallic ink is applied to the substrate 23, a layer of 20 g/m$^2$ may be required to obtain the resistivity of 0.1 $\Omega/ft^2$. Other constitutions are considered as well, including other types of metal, of binder and of solvents. For instance, the silver bits may consist of a silver coating on a copper base. One way considered to apply the metallic ink is to use printing by engraving. Once formed, all metallic parts of the metallic-ink layer 22 should contact each other (i.e., form a continuous coating) so as to avoid electrical arcing. It is considered to add overlay strips of metal to cover edges of the container 10, if the container 10 has sharp edges.

Referring to FIG. 4, there is illustrated at 25 a configuration for the metallic-ink layer 22. The configuration 25 features a plurality of circular holes (i.e., openings). The holes are provided to control the amount of energy reaching the food, and to limit the amount of silver used in the manufacturing of the food container 10. By providing these holes, it is possible to block a selected portion of microwaves with a partial covering of the structural wall 20 with the metallic ink. The maximum dimension of holes (i.e., the diameter when the holes are circular) is proportional to the wavelength of the microwaves that pass. It is considered to provide holes of different dimensions and shapes to regulate the amount of microwaves that will reach the food. The following data is provided for example only, but is representative of the dimensioning of holes for a food container 10 having selected specifications:

Maximum dimension of less than 3 mm: 0% wave passage;
Maximum dimension of 6 mm: Energy=0.4 W-min/hole;
Maximum dimension of 10 mm: Energy=2.7 W-min/hole;
Maximum dimension of 14 mm: Energy=5.6 W-min/hole;
Maximum dimension of 18 mm: Energy=11.14 W-min/hole;
Maximum dimension of 20 mm: Energy=16 W-min/hole;
Maximum dimension of 22 mm: Energy=18 W-min/hole.

Accordingly, in accordance with the energy that must be fed to various compartments of the food container 10, in a multi-compartment configuration, there is provided a calculated amount of holes on the portions of the structural wall 20 surrounding the compartments. With these holes, the amount of energy reaching the food is controlled, and therefore the temperature of the food is controlled with these holes. Accordingly, a temperature-sensitive food element may be exposed to a lesser amount of energy by being located in a first compartment, while a second food element requiring more energy may be exposed to a greater amount thereof by being located in a second compartment. It is also considered to have a greater ratio of opening surface (by more holes, or by holes of greater dimensions) per coating surface on the portion of the structural defining a first one of the compartments than a ratio of opening surface per coating surface on the portion of the structural defining a second one of the compartment to allow more microwaves per coating surface to reach the food item of the first compartment.

Figure 3:
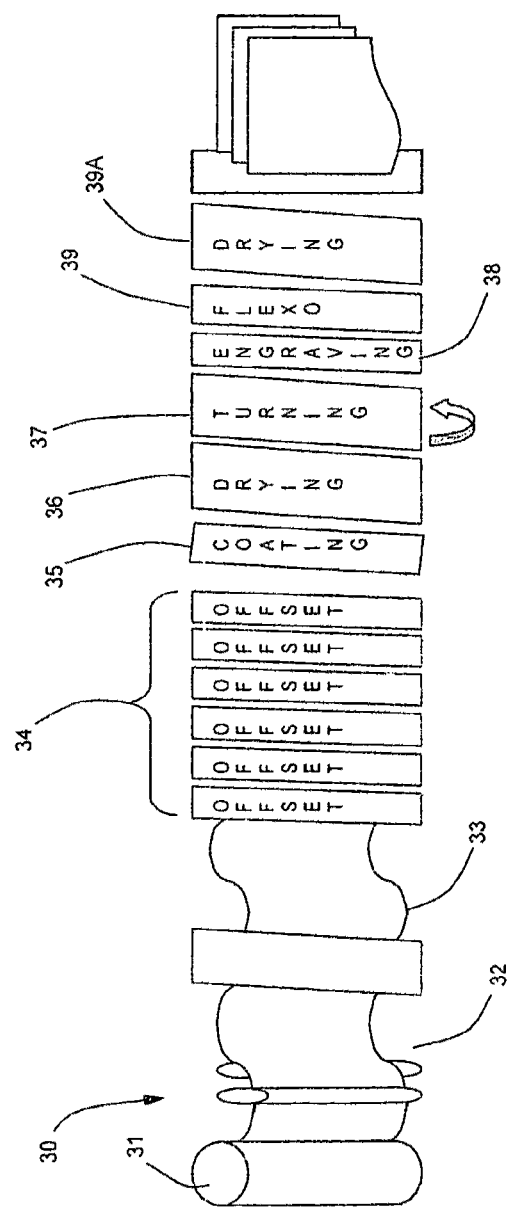
FIG. 3 is a schematic view of a process for producing a metallic-ink label for use in the food container of FIG. 2.

Referring to FIG. 3, a method is illustrated for fabricating the labels 22-24. According to a first step 30, a roll 31 of the substrate 23 is unrolled to release a film of the substrate 23. In the present case, the film of material is plastic, but may be any other appropriate material.

According to step 32, the film of plastic is subjected to a corona treatment on both sides to open the plastic pores.

In step 33, the film is cut into sheets.

According to step 34, each sheet is subjected to various stations of offset printing, so as to print information of the exposed layer 24 (FIG. 2). The stations may be for the various colors of the layer 24.

In step 35, the coating of the exposed layer 24 is applied to the substrate 23.

In step 36, the coating and ink of the exposed layer 24 are dried.

There may be performed at step 37 a turning step. This step depends on the type of equipment used.

In step 38, the engraving step is performed so as to apply the metallic-ink layer 22, as detailed above.

In step 39, a further printing step may be performed. The printing step uses a Flexo unit to print a black layer on the exterior of the metallic-ink layer 22. Black is a neutral color that has insulating properties. The black color is printed over the holes in the metallic-ink layer 22. Because the metallic particles of the metallic-ink layer 22 are opaque, and because of the relatively small thickness of the food container 10, the black coating allows the metallic-ink layer 22 to be hidden. Another drying step 39A is performed.

Figure 5:
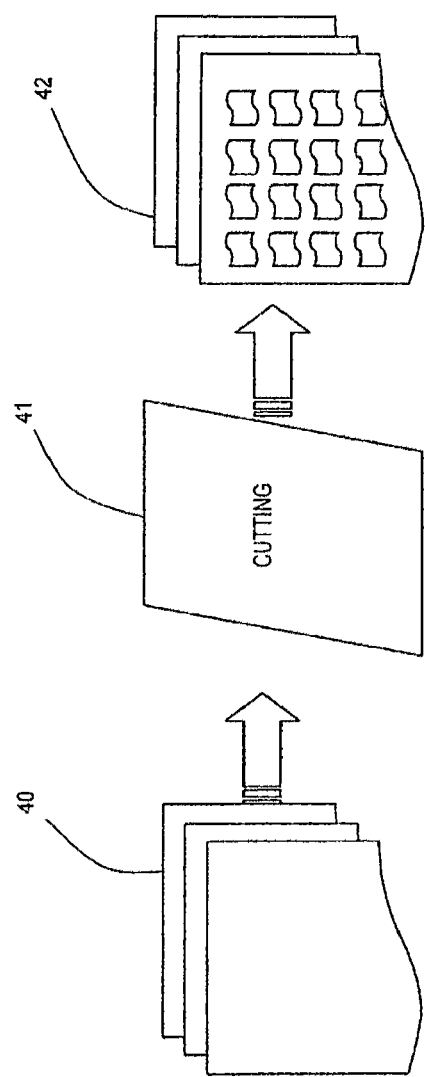
FIG. 5 is a schematic view of a method for cutting the label of FIG. 4.

Referring to FIG. 5, the sheets exiting the manufacturing steps are shown at 40. The sheets are cut into the labels 22-24, as shown in steps 41 and 42.

Figure 6:
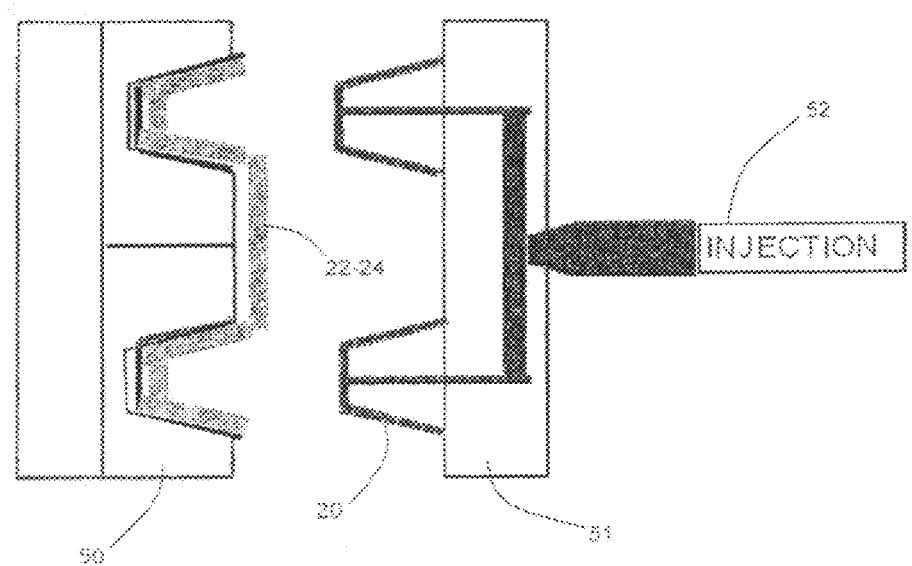
FIG. 6 is a schematic view illustrating the molding of the food container of FIG. 2.

Referring to FIG. 6, a molding step is schematically illustrated. According to the molding step, a press has a mold portion 50 and another mold portion 51. The mold portions 50 and 51 are movable toward one another for the subsequent injection of molten plastic through the injection unit 52, into a cavity formed between the mold portions 50 and 51. Prior to the injection cycle, the labels 22-24 are inserted into the mold portion 50. Accordingly, once the molten plastic material is injected in the mold cavity, the food container 10 will be produced, with the label 22-24 being secured to the structural wall 20.

The molten plastic material enters the mold cavities in a hot liquid state. The combination of injection pressure and heat will alter the binder of the metallic ink 22, and thereby cause the merger of the metallic ink 22—and thus of the label 22-24—to the plastic of the container 10.

In order not to alter the distribution of the silver bits in the metallic-ink coating, the parts of the label 22-24 having metallic ink are not exposed to the turbulent flow of molten plastic in the mold cavities. Accordingly, the position of the metallic ink portions on the label 22-24 are selected as a function of their position in the mold.

The construction of the label 22-24 may use static electricity to hold the label in the mold portion 50. The injection is simple, double or triple as a function of the number of compartments of the food container 10. The injection may be performed from an interior of the food container 10 so as not to damage the labels 22-24.

Other manufacturing methods may be used to fabricate the food container 10. For instance, the metallic-ink layer may be painted directly to the structural wall. Although reference is made to label 22-24, the label 22-24 refers to an item positioned on a surface of the structural wall 20 for the reasons described above.

The invention claimed is:

1. A food container for microwave use, comprising:
   a container portion comprising at least one compartment for receiving a food item, the container portion having at least one structural wall defining the lateral sides of the container portion, the structural wall being made of a polymer;
   a label secured to the structural wall and covering continuously and completely the lateral sides of the container portion opposite the at least one compartment, the label having an inner surface against the structural wall and an outer surface oriented away from the structural wall, the label comprising:
   a substrate defining the outer surface of the label; and
   a metallic ink defining partly the inner surface of the label, the metallic ink defining a continuous coating on the label to continuously and completely cover the lateral sides of the container portion opposite the at least one compartment save for openings in the continuous coating, the openings having a selected dimension to allow a given amount of microwaves to pass therethrough to reach the food item in the compartment.

2. The food container according to claim 1, wherein the selected dimension of the openings has a maximum value ranging between 3 mm and 22 mm.

3. The food container according to claim 2, wherein the openings have a circular shape, and the selected dimension is the diameter.

4. The food container according to claim 1, comprising at least two of the compartment, the selected dimension of the openings in the coating on the portion of the structural defining a first one of the compartment being greater than the selected dimension of the openings in the coating on the portion of the structural defining a second one of the compartment to allow more microwaves per coating surface to reach the food item of the first compartment.

5. The food container according to claim 1, comprising at least two of the compartment, a ratio of opening surface per coating surface on the portion of the structural defining a first one of the compartment being greater than a ratio of opening surface per coating surface on the portion of the structural defining a second one of the compartment to allow more microwaves per coating surface to reach the food item of the first compartment.

6. The food container according to claim 1, further comprising a binder and a solvent in the metallic ink, the solvent evaporating to cause the metallic ink to bond to the structural wall.

7. The food container according to claim 1, wherein the coating of metallic ink has a thickness of 3 μm.

8. The food container according to claim 1, wherein the metallic ink has a resistivity of 0.1 $\Omega/ft^2$.

9. The food container according to claim 1, wherein the metallic ink comprises silver bits in a solvent.

10. The food container according to claim 9, wherein the silver bits are a silver coating on a copper base.

11. The food container according to claim 1, further comprising ornamentation printed on the outer surface of substrate.

12. The food container according to claim 1, further comprising a coating of black ink between the substrate and the metallic ink.

* * * * *